US008287025B1

(12) United States Patent
Bandola et al.

(10) Patent No.: US 8,287,025 B1
(45) Date of Patent: Oct. 16, 2012

(54) REMOVABLE WINDSHIELD SUN SCREEN DEVICE

(76) Inventors: Gerald Bandola, Colton, CA (US); Pearl Bandola, Colton, CA (US)

( * ) Notice: Subject to any disclaimer, the term of this patent is extended or adjusted under 35 U.S.C. 154(b) by 0 days.

(21) Appl. No.: 13/208,957

(22) Filed: Aug. 12, 2011

(51) Int. Cl.
*B60J 3/02* (2006.01)

(52) U.S. Cl. ............ 296/97.1; 296/97.6; 296/97.9

(58) Field of Classification Search ............... 296/97.1, 296/97.6, 97.7, 97.9; 160/370.21; D12/191
See application file for complete search history.

(56) References Cited

U.S. PATENT DOCUMENTS

| | | | |
|---|---|---|---|
| 2,070,434 A | | 2/1937 | Kangas |
| 2,549,395 A | * | 4/1951 | Short, Sr. ................ 296/97.5 |
| 2,709,945 A | | 6/1955 | Kuhn |
| 4,023,855 A | * | 5/1977 | Janata et al. ............ 296/97.6 |
| 4,172,613 A | * | 10/1979 | Furando ................. 296/97.7 |
| 4,915,488 A | | 4/1990 | Lambert et al. |
| 4,958,879 A | * | 9/1990 | Gillum ................... 296/97.6 |
| 5,024,479 A | * | 6/1991 | Bryngelson ............ 296/97.7 |
| 5,333,927 A | * | 8/1994 | PreJean ................. 296/97.7 |
| 5,494,328 A | * | 2/1996 | Lehr .................... 296/97.6 |
| 5,979,967 A | * | 11/1999 | Poulson ................ 296/97.9 |
| 6,296,294 B1 | * | 10/2001 | Kohnle et al. .......... 296/97.9 |
| 6,513,855 B2 | * | 2/2003 | Zenisek ................. 296/97.9 |
| 6,945,587 B2 | * | 9/2005 | Smoot ................... 296/97.9 |
| 7,011,355 B1 | * | 3/2006 | Su ....................... 296/97.7 |
| 7,014,244 B1 | * | 3/2006 | Baldwin ................ 296/97.9 |
| 7,121,672 B1 | * | 10/2006 | Swain ................... 359/601 |
| 2004/0130178 A1 | * | 7/2004 | Conforti ................ 296/97.9 |
| 2005/0073168 A1 | * | 4/2005 | Herrera ................. 296/97.1 |

* cited by examiner

*Primary Examiner* — Glenn Dayoan
*Assistant Examiner* — Gregory Blankenship

(57) ABSTRACT

The removable windshield sun screen device provides for screening sun that typically comes in adjacent to and near a rearview mirror inside a windshield of an auto. An area surrounding the rearview mirror is typically not sufficiently shielded by existing auto sun visors, hence the value of the present device. Further, the present device is pliable and removable, and therefore easily transported and stored. The device may be removably fastened to a windshield interior by more than one means.

6 Claims, 3 Drawing Sheets

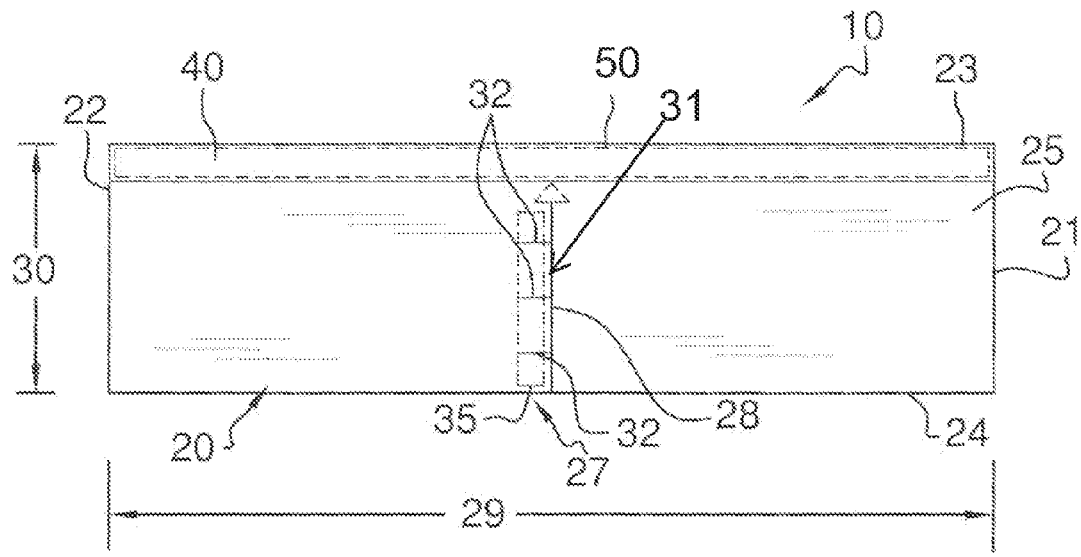
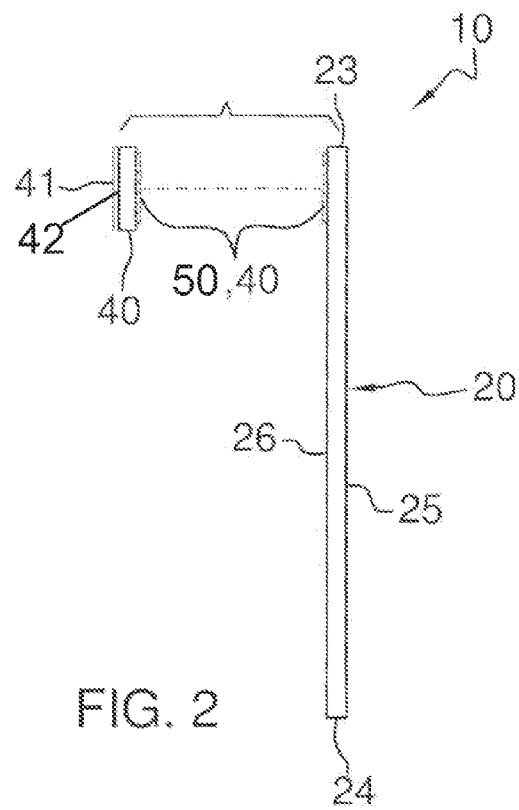

FIG. 3
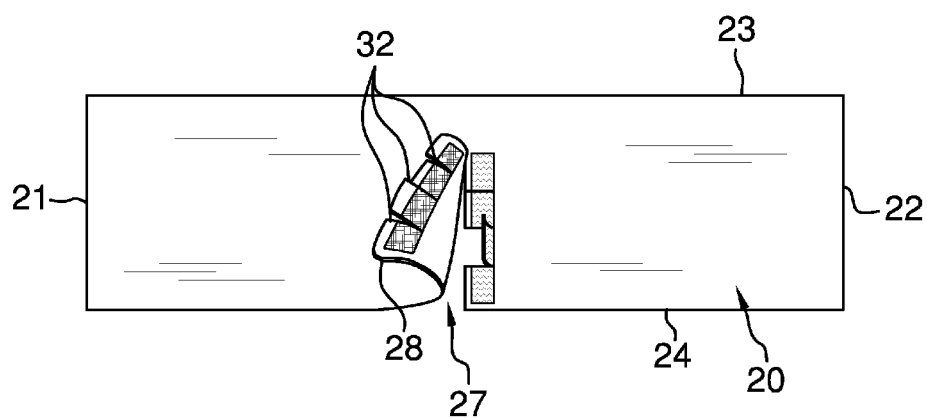
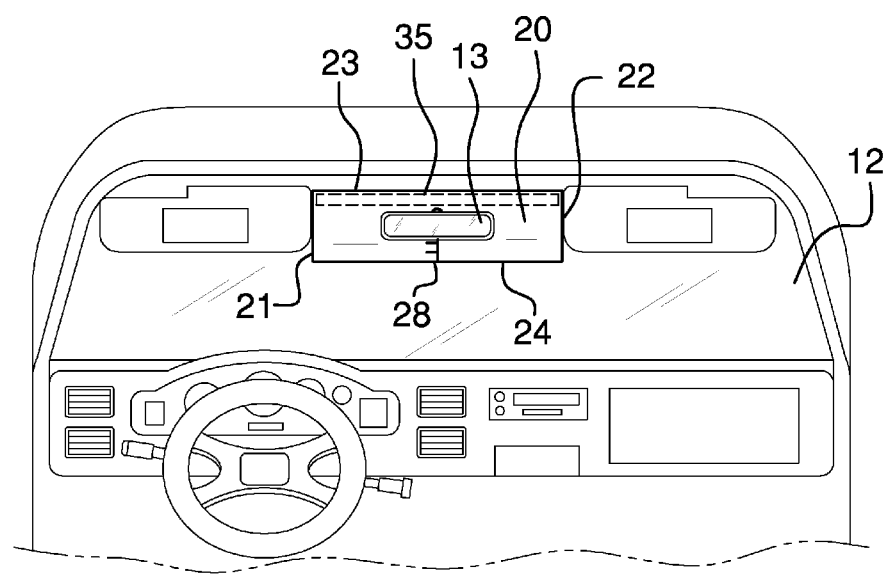
FIG. 4

REMOVABLE WINDSHIELD SUN SCREEN DEVICE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

There exists a problem with automobiles wherein sun rays, at dawn and dusk primarily, invade the passenger and especially driver's vision. The area surrounding the windshield rearview mirror is of primary concern related to the present device, as this area is not covered well by existing sun visors within autos. While some autos do have small screens for this area, none adequately cover, and none are truly removable. The present device solves these problems. Additionally, the present device is pliable and may be not only removed but also easily stored.

FIELD OF THE INVENTION

The removable windshield sun screen device relates to windshield sun visors and more especially to a removable sun screen device especially suited to blocking sun's rays adjacent to a windshield rearview mirror.

SUMMARY OF THE INVENTION

The general purpose of the removable windshield sun screen device, described subsequently in greater detail, is to provide a removable windshield sun screen device which has many novel features that result in an improved removable windshield sun screen device which is not anticipated, rendered obvious, suggested, or even implied by prior art, either alone or in combination thereof. To attain this, the removable windshield sun screen device provides for screening sun that typically comes in adjacent to and near a rearview mirror inside a windshield of an auto. An area surrounding the rearview mirror is typically not sufficiently shielded by existing auto sun visors, hence the value of the present device. Further, the present device is pliable and removable, and therefore easily transported and stored. The device may be removably fastened to a windshield interior by more than one means. The device may employ an attachment strip that is adhesively bonded to the windshield interior. As further example of various shield attachment means, the device may also employ suction cups on the shield front, disposed upwardly, to removably fasten to the windshield interior. As further example of portability, the device may be provided with several attachment strips. Using the plurality of attachment strips or the suction cups allows one shield to be used within a plurality of autos. The size of the shield is critical to performance and includes a length of about 18 inches and a width of about 5½ inches. The centrally and vertically disposed slit that provides for rearview mirror post surround has a slit length of about 4½ inches, with horizontal cuts for best custom fit.

Of further importance is that the shield may provide a central vertical overlap to ensure no sun invasion. And, horizontally disposed cuts allow a user to fit the shield snugly around an existing rearview mirror post to further ensure sun ray blockage. The shield may be allowed to dangle downwardly from the windshield attachment means. The shield may also be provided with attachment means for the bottom so that the shield is fitted against the windshield from top to bottom.

Thus has been broadly outlined the more important features of the improved removable windshield sun screen device so that the detailed description thereof that follows may be better understood and in order that the present contribution to the art may be better appreciated.

An object of the removable windshield sun screen device is to block sun rays that invade adjacent and proximal to an auto's windshield rearview mirror.

Another object of the removable windshield sun screen device is to be removable.

A further object of the removable windshield sun screen device is to be pliable.

An added object of the removable windshield sun screen device is to snugly fit surround the windshield rearview mirror post of an auto.

These together with additional objects, features and advantages of the improved removable windshield sun screen device will be readily apparent to those of ordinary skill in the art upon reading the following detailed description of presently preferred, but nonetheless illustrative, embodiments of the improved removable windshield sun screen device when taken in conjunction with the accompanying drawings.

BRIEF DESCRIPTION OF THE DRAWINGS

FIG. 1 is a front elevation view of the shield.
FIG. 2 is a lateral elevation view.
FIG. 3 is a front perspective view of the shield.
FIG. 4 is a front in-use perspective view.

DETAILED DESCRIPTION OF THE DRAWINGS

Figure 5:
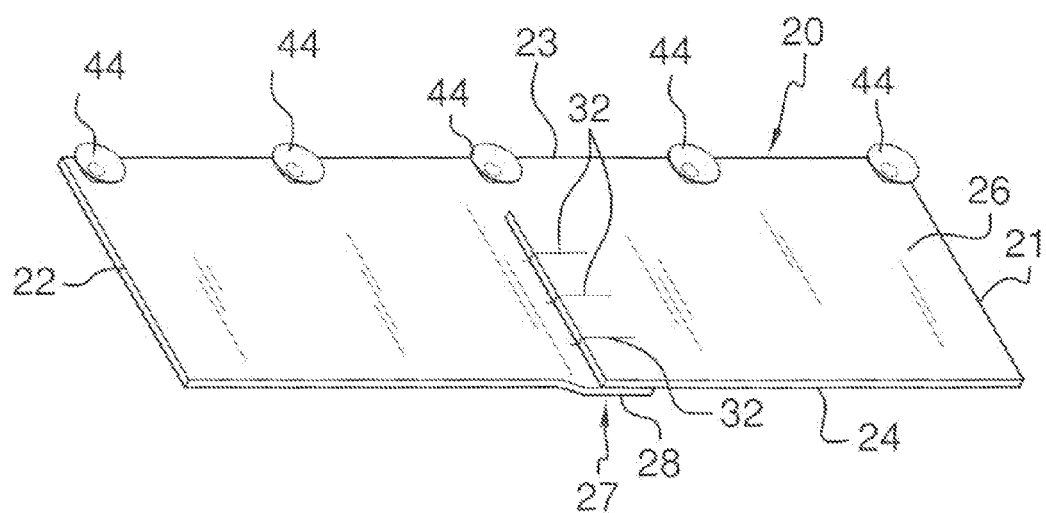
FIG. 5 is a back perspective view with suction cup attachment means.

With reference now to the drawings, and in particular FIGS. 1 through 5 thereof, the principles and concepts of the removable windshield sun screen device generally designated by the reference number 10 will be described.

Referring to FIG. 3, the device 10 partially comprises a pliable shield 20 having a first end 21 spaced apart from a second end 22, and a top 23 spaced apart from a bottom 24.

Referring to FIG. 2, the shield 20 further comprises a front 25 and a back 26. The shield 20 also comprises a length 29 of about 18 inches and a width 30 of about 5½ inches. The vertically disposed slit 27 is disposed centrally within the bottom 24 and extended toward the shield 20 top 23. The slit 27 has a slit length 31 of about 4½ inches.

Referring to FIG. 1 and again to FIG. 3, the overlap 28 is extended centrally from a portion of the first end 21. The overlap 28 is extended beyond the slit 27 toward the second end 22. The plurality of horizontally disposed cuts 32 is disposed within the overlap 28. Hook and loop 35 selectively fastens the overlap 28 to a centrally disposed portion of the second end 22.

Referring to FIG. 2, attachment means 40 is affixed upwardly and rearwardly to the shield 20.

Referring to FIG. 4, the attachment means 40 provides for removable attachment of the shield 20 to the windshield 12 interior adjacent to and surrounding the existing rearview mirror 13 of an auto.

Referring again to FIG. 2, the attachment means 40 illustrated herein comprises an attachment strip 41 with an adhesive 42 affixed to one of opposite sides of the attachment strip 41. The attachment strip 41 is thereby bonded to the windshield 12 interior. A second hook and loop 50 is affixed to another of the opposite sides of the attachment strip 41. The second hook and loop 50 is affixed upwardly to the shield 20 front 25. The shield 20 is thereby removably affixed to the attachment strip 41.

Referring to FIG. 5, the device 10 shield 20 comprises a plurality of spaced apart suction cups 44 disposed upwardly on the front 25 of the shield 20. The suction cups 44 are selectively and removably affixed to the existing windshield 12 interior.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the removable windshield sun screen device may be used.

What is claimed is:

1. A removable windshield sun screen device comprising, in combination:
    a pliable shield having a first end spaced apart from a second end, a top spaced apart from a bottom, a front, and a back;
    a vertically disposed slit disposed centrally within the bottom and extended toward the top, the slit having a slit length of about 4½ inches;
    an overlap extended from a portion of the first end, the overlap extended beyond the slit toward the second end;
    a plurality of horizontally disposed cuts within the overlap;
    a hook and loop selectively fastening the overlap to a centrally disposed portion of the second end;
    an attachment means affixed upwardly and rearwardly to the shield;
    whereby the shield is removably affixed to the windshield.

2. The device according to claim 1 wherein the attachment means affixed upwardly and rearwardly to the shield further comprises an attachment strip;
    an adhesive affixed to a one of opposite sides of the attachment strip, whereby the attachment strip is bonded to an existing windshield interior;
    a second hook and loop affixed to another of the opposite sides of the attachment strip, the hook and loop affixed upwardly to the shield front;
    whereby the shield is removably affixed to the attachment strip.

3. The device according to claim 1 wherein the attachment means further comprises a plurality of spaced apart suction cups disposed upwardly on the front of the shield, the suction cups removably affixed to the existing windshield interior.

4. A removable windshield sun screen device comprising, in combination:
    a pliable shield having a first end spaced apart from a second end, a top spaced apart from a bottom, a front, a back, a length of about 18 inches and a width of about 5½ inches;
    a vertically disposed slit disposed centrally within the bottom and extended toward the top, the slit having a slit length of about 4½ inches;
    an overlap extended from a portion of the first end, the overlap extended beyond the slit toward the second end;
    a plurality of horizontally disposed cuts within the overlap;
    a hook and loop selectively fastening the overlap to a centrally disposed portion of the second end;
    an attachment means affixed upwardly and rearwardly to the shield;
    whereby the shield is removably affixed to the windshield.

5. The device according to claim 4 wherein the attachment means affixed upwardly and rearwardly to the shield further comprises an attachment strip;
    an adhesive affixed to a one of opposite sides of the attachment strip, whereby the attachment strip is bonded to an existing windshield interior;
    a second hook and loop affixed to another of the opposite sides of the attachment strip;
    the hook and loop affixed upwardly to the shield front;
    whereby the shield is removably affixed to the attachment strip.

6. The device according to claim 4 wherein the attachment means further comprises a plurality of spaced apart suction cups disposed upwardly on the front of the shield, the suction cups removably affixed to the existing windshield interior.

* * * * *